Nov. 29, 1960     H. D. LATHROP     2,962,152
CONVEYOR TRACK SUPPORT
Filed Dec. 24, 1956
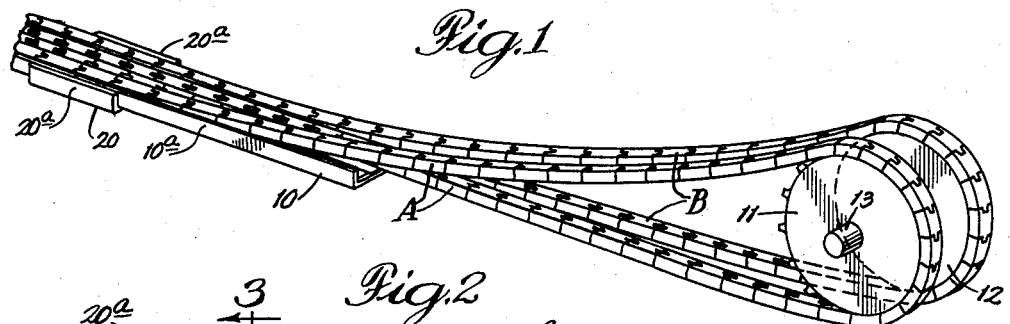
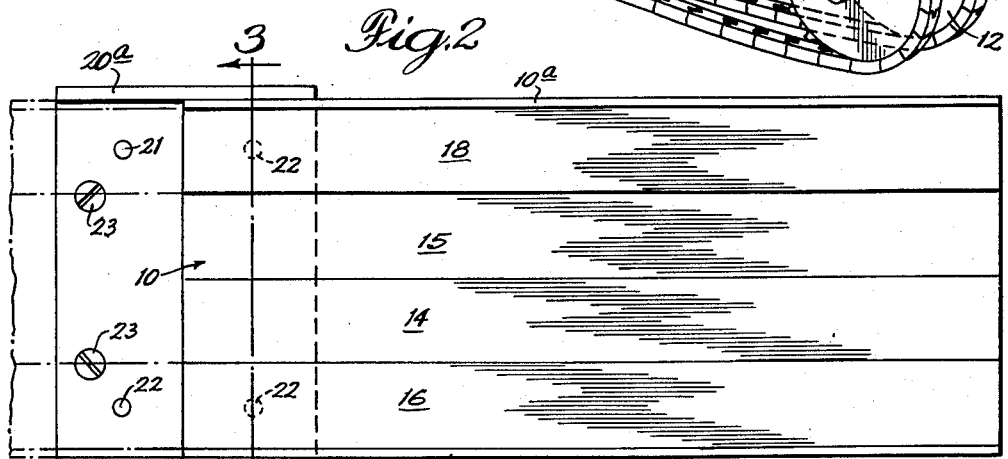
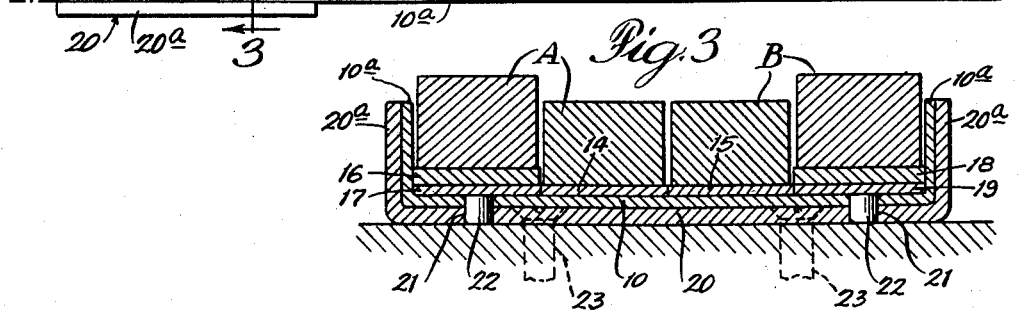
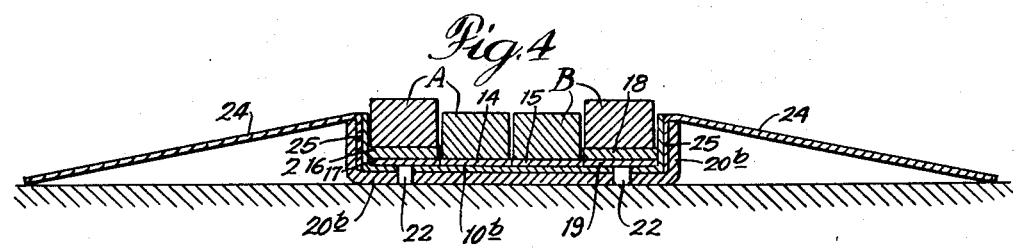
INVENTOR:
Harry D. Lathrop,
BY Dawson, Tilton & Graham
ATTORNEYS.

United States Patent Office 2,962,152
Patented Nov. 29, 1960

2,962,152
CONVEYOR TRACK SUPPORT

Harry D. Lathrop, Chicago, Ill., assignor to The Lathrop-Paulson Company, Chicago, Ill., a corporation of Illinois Filed Dec. 24, 1956, Ser. No. 630,205

3 Claims. (Cl. 198—189)

This invention relates to a conveyor track support, and more particularly to means for supporting upon the floor of a factory or other building a continuous conveyor whereby the conveyor is supported at a slight elevation above the floor for the greater portion of its travel.

Conveyor tracks have been heretofore provided on which endless chains are drawn, the tracks being supported at elevations substantially above the floor of the building and requiring elevated supporting structure therefor which restricts movement through the factory transversely of the conveyor structure and with the result that the conveyor system serves as a barrier dividing the factory floor into compartments.

An object of the present invention is to provide conveyor mechanism in which the conveyor chains are supported slightly above floor level upon widely spaced-apart base members, with the result that the structure provides practically no obstruction to movement through the factory and over the conveyors, while at the same time permitting the floors to be washed or otherwise treated, the spaces below the track permitting the flow of washing fluid, etc. thereunder. A further object is to provide, in combination with the supporting structure described, ramp means cooperating with the base members to provide tracks whereby vehicles can be passed readily across the conveyors even while the conveyors are in operation. A still further object is to provide, in combination with continuous chain conveyors, and the like, track members for supporting the conveyors and base members resting upon the floor of the factory or building and spaced widely apart to carry the tracks at a slight elevation above the floor while at the same time at such a low elevation that the conveyor system does not form a real obstruction to free movement across the floors of the factory. Yet a further object is to provide base members which may rest freely upon the floor of the building or which may be provided with pins for interlocking with recesses in the floor while at the same time providing a support for the conveyor track in maintaining the same in true alignment with the conveyor propelling means, while also cooperating with ramps or bridge devices which permit the conveyor to be traversed by wheelbarrows, trucks and motor-driven vehicles within the factory. Other specific objects and advantages will appear as the specification proceeds.

The invention is shown, in illustrative embodiments, by the accompanying drawing, in which—

Figure 1 is a broken perspective view of a continuous chain conveyor mounted upon a track and base embodying my invention; Fig. 2, a broken top plan view showing the base structure on an enlarged scale; Fig. 3, a transverse sectional view, the section being taken as indicated at line 3—3 of Fig. 2; and Fig. 4, a view similar to Fig. 3 but showing a modified form of the invention in which ramps are employed.

In the illustration given in Figs. 1–3, inclusive, A and B designate chain conveyors which operate in pairs and are carried by a track 10. The conveyor A passes over a sprocket 11 and the conveyor B passes over a spaced sprocket 12, the sprockets being carried by common shafts 13 which may be driven by a motor (not shown). The links forming chains A and B may be of the usual type comprising body members apertured to receive the sprocket projections and provided with ball-and-socket connecting members, as illustrated, for example, in Paulson Patent 1,956,298. Since such chains are well known and the driving of such chains through the use of sprockets is well understood, a further detailed description herein is believed unnecessary.

In the specific illustration given, the track 10 is provided with a vertical flange portion 10a and upon the bottom of the track there is provided wearing surfaces 14 and 15 for the inner portions of the chains A and B, respectively. A raised bearing 16 is supported above the bearing 17 to maintain the outer links of the chain A at an elevated position above the inner chain A, as illustrated best in Fig. 3. Similarly, a raised bearing strip 18 is supported above the strip 19 for supporting the outer length of the chain B above the inner length thereof, as illustrated in Fig. 3. Wedge members may be provided between the chain portions A and A to guide them in side-by-side alignment, as illustrated in Fig. 1, and similarly a guide or wedge member may be employed to direct the chain members B and B into the aligned positions illustrated in Fig. 1. Since the outer chain lengths A and B are elevated above the inner portions, such outer portions serve as the supporting means for the boxes or other devices being conveyed by the chain and thus provide a relatively wide base support for the carrying of such articles. It will be understood that in the operation of the conveyor, a set of sprockets corresponding to sprockets 11 and 12 are employed at the other end of the conveyor (not shown) and that a motor may be used for driving the sprocket-carrying shaft 13 at one end of the structure.

In the carrying out of my invention, I provide a base member 20 which may be relatively narrow but which is adapted to receive and support lengths of the track 10. The base 20 is provided with vertical side flanges 20a and to receive the side flanges 10a of the track 10. The base is provided with recesses 21 adapted to receive pins 22 welded to the track 10 so as to lock the track firmly in position upon the base 20 and as illustrated more clearly in Figs. 2 and 3.

If desired, the base 20 may be provided with bolts 23 passing through openings in the base 20 and into the floor or base of the building for anchoring the base plates 20 firmly in position. For many practical purposes, however, I have found that the bolts 23 may be omitted because the weight of the track as concentrated upon the base plate 20 is effective in maintaining the track firmly in position and in true alignment with the sprocket driving members.

I have found that an effective support can be provided through the structure shown so that 95% of the track 10 is supported off the floor, the base members 20 occupying less than 5% of the floor space. With this structure, cleaning of the floor can be accomplished because of the open space below the tracks, while at the same time the tracks are in close relation to the floor and permit the movement of traffic across the floor and over the track members.

The passage of traffic over the conveyor structure is facilitated by the ramp mechanism illustrated in the modification shown in Fig. 4. In this structure, the base plate member 20b is wider than the base plate 20 shown in Figs. 1 to 3, inclusive, and this additional width permits a ramp member 24 to be placed in position with the depending flange 25 thereof locked between the vertical flange of the base 20b and the vertical flange of the track 10b. The ramps 24 located on either side of the base 20b may be of any desired width so as to permit the passage of a single wheeled vehicle or a four-wheeled truck or other vehicle over the conveyor. The track 10b is similar to the track 10 shown in Fig. 3, and need not be described in detail, and the chain conveyors illustrated are also the same.

In the operation of the apparatus, the sprockets are driven by a motor at one end of the conveyor system and the chain A and chain B are each driven in the manner illustrated, one length of the chain A being carried by the elevated bearing 16, and a length of the chain B being carried by the elevated bearing 18, so that the spaced-apart elevated portions of the chain carry the cases or other objects along the floor. If desired, the sprocket shaft 13 may be supported in an elevated position, as illustrated in Fig. 1, and the cases, etc. discharged therefrom onto another conveyor or chute, etc., or, if desired, the shaft 13 may be mounted in a recessed portion of the floor so as to make the top flights of the chain in the same plane as the chain portions on track 10. In any form of construction, the base plates 20 and 20b perform the important function of spacing the track members slightly above the floor so that an effective conveyor system is provided for the moving of cases and other objects and involving a minimum of lifting or manual handling of cases while at the same time providing a conveyor structure which does not form a barrier to transverse traffic within the building and also permitting cleaning of the floor of the building by the spacing of the track from the floor surface.

While, in the foregoing specification, I have set forth a specific structure in considerable detail for the purpose of illustrating an embodiment of the invention, such details of structure may be varied widely by those skilled in the art without departing from the spirit of my invention.

I claim:

1. In an endless conveyor for floor installation, a U-shaped track, a pair of endless conveyor chains mounted in said track for movement therein, with the runs of the chains all being supported by the inner bottom of said track, whereby the runs are in horizontal, side-by-side relation, said track being equipped with a pair of spaced-apart raised bearings adjacent its longitudinal side walls and supporting one run of each chain therein above the return run of the corresponding chain and above the longitudinally-extending side walls of the U-shaped track, a plurality of spaced-apart plate members supporting said track above the floor, and means interlocking said track on said base members.

2. In an endless conveyor for floor installation, a U-shaped track, a pair of endless conveyor chains disposed in said track with the runs thereof in horizontal, side-by-side relation, said track being equipped with two pairs of continuous bearings therein supporting one run of each chain therein above the other run therein, the higher run of each chain providing a top surface above the sides of said U-shaped track, a plurality of spaced-apart plate members supporting said track above the floor, and means interlocking said track with said base members.

3. In an endless conveyor for floor installation, a U-shaped track having upwardly-extending side flanges, a pair of endless conveyor chains disposed in horizontal, side-by-side relation in said track with the runs of each chain in horizontal, side-by-side relation, said track being equipped with two pairs of continuous bearings supporting one run of each chain therein above the other run thereof, the higher runs of said chains providing top surfaces above said side flanges, a plurality of spaced-apart plate members supporting said track above the floor, means interlocking said track on said plate members, and a pair of sprockets for each chain, corresponding sprockets of each chain being arranged for mounting on a common shaft.

References Cited in the file of this patent

UNITED STATES PATENTS

| | | |
|---|---|---|
| 382,043 | Klinik et al. | May 1, 1888 |
| 657,639 | Brestle | Sept. 11, 1900 |
| 708,576 | McCammon et al. | Sept. 9, 1902 |
| 1,535,785 | Luce | Apr. 28, 1925 |
| 1,729,177 | Morgan | Sept. 24, 1929 |
| 1,789,504 | Uline | Jan. 20, 1931 |

FOREIGN PATENTS

| | | |
|---|---|---|
| 366,678 | Great Britain | Feb. 11, 1932 |